United States Patent
Onda et al.

(10) Patent No.: US 8,781,776 B2
(45) Date of Patent: Jul. 15, 2014

(54) POSITION CALCULATING METHOD AND POSITION CALCULATING DEVICE

(75) Inventors: Kenji Onda, Suwa (JP); Anand Kumar, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 275 days.

(21) Appl. No.: 13/084,469

(22) Filed: Apr. 11, 2011

(65) Prior Publication Data

US 2011/0257920 A1    Oct. 20, 2011

(30) Foreign Application Priority Data

Apr. 9, 2010  (JP) ................................ 2010-090557

(51) Int. Cl.
*G01C 17/38*    (2006.01)

(52) U.S. Cl.
USPC ................. 702/94; 702/95; 702/141; 702/142

(58) Field of Classification Search
USPC ..................... 702/94–95, 141–142
See application file for complete search history.

(56) References Cited

U.S. PATENT DOCUMENTS

| | | | |
|---|---|---|---|
| 6,856,903 B2 * | 2/2005 | Ishigami et al. | 701/480 |
| 8,310,684 B2 * | 11/2012 | Lee et al. | 356/614 |
| 2003/0155469 A1 * | 8/2003 | Ugrin | 244/161 |
| 2006/0217921 A1 * | 9/2006 | Kourogi et al. | 702/150 |
| 2011/0198145 A1 * | 8/2011 | Bullis | 180/235 |
| 2012/0038508 A1 * | 2/2012 | Mizuochi et al. | 342/357.23 |

FOREIGN PATENT DOCUMENTS

JP    08-068651 A    3/1996

* cited by examiner

*Primary Examiner* — Mischita Henson
(74) *Attorney, Agent, or Firm* — Kilpatrick Townsend & Stockton LLP

(57) ABSTRACT

A method of calculating the position of a moving body includes: detecting a movement direction of the moving body; calculating a velocity vector of the moving body using a detection result of an acceleration sensor installed in the moving body; correcting the velocity vector using the movement direction; and calculating the position of the moving body using the corrected velocity vector.

7 Claims, 16 Drawing Sheets

| | | SPHERICAL COORDINATE SYSTEM | | CARTESIAN COORDINATE SYSTEM |
|---|---|---|---|---|
| | /7231 | /7253 | /7255 | /7257 |
| | CALCULATION TIME | SIZE | DIRECTION | VECTOR COMPONENT |
| OLD | T1 | \|V1\| | (φ1, φ1) | (CVx1,CVy1,CVz1) |
| | T2 | \|V2\| | (φ2, φ2) | (CVx2,CVy2,CVz2) |
| | T3 | \|V3\| | (φ3, φ3) | (CVx3,CVy3,CVz3) |
| NEW | ⋮ | ⋮ | ⋮ | ⋮ |

FIG. 7

| | /7231 | /7293 | /7295 |
|---|---|---|---|
| | CALCULATION TIME | OUTPUT POSITION | POSITIONING TYPE |
| OLD | T1 | (X1,Y1,Z1) | INERTIAL NAVIGATION |
| | T2 | (X2,Y2,Z2) | INERTIAL NAVIGATION |
| | T3 | (X3,Y3,Z3) | INERTIAL NAVIGATION |
| | ⋮ | ⋮ | ⋮ |
| | T10 | (X10,Y10,Z10) | GPS |
| NEW | | | ⋮ |

FIG. 8

POSITION CALCULATING METHOD AND POSITION CALCULATING DEVICE

BACKGROUND

1. Technical Field

The present invention relates to a position calculating method and a position calculating device.

2. Related Art

A GPS (global positioning system) is widely known as a positioning system using a positioning signal, and is used for a position calculating device built in a mobile phone, a car navigation device, or the like. The GPS performs a position calculation operation for calculating a timepiece error and the position coordinates of a position calculating device on the basis of information, such as the positions of a plurality of GPS satellites or a pseudorange from each GPS satellite to the position calculating device.

In position calculation using a positioning signal, there is a problem in that the accuracy of position calculation is reduced due to various error factors. Accordingly, various techniques for improving the accuracy of position calculation have been proposed. For example, JP-A-8-68651 discloses a technique of correcting the position calculated using a GPS by performing an inertial navigation operation using a velocity vector of a moving body.

In the inertial navigation operation used in the past, a method of calculating a velocity vector by integrating a detected acceleration vector and then calculating a current position by adding the amount of movement corresponding to the current velocity vector to the previous position is used if an acceleration sensor is used, for example. Here, the "vector" is a term of convenience for expressing a direction and a size. In order to express the direction and the size, it is needless to say that the value of each axis in a Cartesian coordinate system or a spherical coordinate system can be used, for example. However, even if any notation is selected, it is obvious that it is equivalent to a "vector". Therefore, in this specification, a "vector" is used as a term for expressing both the direction and the size.

However, this does not necessarily mean that a velocity vector is calculated once by performing integration of an acceleration vector whenever the acceleration vector is detected and the position is calculated (more accurately, the computed position is updated) for every calculation of the velocity vector. In a series of processing in which a velocity vector is acquired from an acceleration vector and the position is calculated from the acquired velocity vector, processing called cumulative addition for summation of a plurality of vectors is included in addition to integration. That is, one velocity vector (Expression (2) given below) is calculated by cumulative addition of a vector (Expression (1) given below) obtained by integrating a plurality of acceleration vectors detected continuously, or the current position is calculated from the previous position (computed position is updated) by cumulative addition of a plurality of calculated velocity vectors.

$$\int_{t-1}^{t} \vec{a} \cdot dt = d\vec{v} \quad (1)$$

$$\vec{v}_t = \vec{v}_{t-1} + d\vec{v} \quad (2)$$

For example, the case of calculating one velocity vector from a plurality of acceleration vectors will be described. An acceleration vector is assumed to be fixed during a time until the next detection after an acceleration vector is detected (for a detection interval), even though it is a tiny amount of time in practice. Each of the plurality of acceleration vectors detected continuously is integrated at detection intervals, and cumulative addition (summation) of each integrated value is performed over a predetermined unit period. As a result, a velocity vector of a unit period is calculated. For example, in a navigation system, one-time position calculation (position update) is performed for 1 second but acceleration detection is performed many times for 1 second.

Thus, there is the following problem in a series of processing for calculating the position from the detection of an acceleration vector, which has been performed in the related art. That is, since a velocity vector is sequentially calculated while performing integration and cumulative addition of acceleration vectors detected at short detection intervals, there is a problem in that an error included in a velocity vector cumulatively increases with time. Undoubtedly, an increase in an error included in the velocity vector causes a reduction in the accuracy of position calculation.

SUMMARY

An advantage of some aspects of the invention is to propose anew technique for improving the accuracy of position calculation using inertial navigation.

According to a first aspect of the invention, a method of calculating a position of a moving body includes: detecting a movement direction of the moving body; calculating a velocity vector of the moving body using a detection result of an acceleration sensor installed in the moving body; correcting the velocity vector using the detected movement direction; and calculating the position of the moving body using the corrected velocity vector.

Moreover, according to another aspect of the invention, a position calculating device installed in a moving body to calculate a position of the moving body includes: an acceleration sensor; a movement direction detecting section which detects a movement direction of the moving body; a velocity vector calculating section which calculates a velocity vector of the moving body using a detection result of the acceleration sensor; a velocity vector correcting section which corrects the velocity vector calculated by the velocity vector calculating section using the movement direction detected by the movement direction detecting section; and a position calculating section which calculates the position of the moving body using the velocity vector corrected by the velocity vector correcting section.

According to the first aspect and the like of the invention, the velocity vector of a moving body is calculated using the detection result of the acceleration sensor installed in the moving body. However, the calculated velocity vector is not used as it is for position calculation. After correcting the calculated velocity vector using the movement direction of the moving body, the position is calculated using the corrected velocity vector.

In the case of calculating the velocity vector of a moving body by cumulative addition of a plurality of detected acceleration vectors, there is a problem in that error is accumulated as time elapses. However, according to the first aspect and the like of the invention, since the calculated velocity vector of the moving body is corrected using the movement direction of the moving body, an error caused by cumulative addition can be removed. As a result, the accuracy of position calculation using inertial navigation is improved.

According to a second aspect of the invention, the method according to the first aspect of the invention may be configured such that the correcting of the velocity vector includes correcting a direction of the velocity vector to the detected movement direction.

Since the acceleration sensor is installed in the moving body, the relative direction of the acceleration sensor with respect to the moving body is fixed. Accordingly, by correcting the calculated direction of the velocity vector to the movement direction of the moving body as in the second aspect of the invention, correction to an appropriate velocity vector along the movement direction of the moving body can be realized.

According to a third aspect of the invention, the method according to the first or second aspect of the invention may be configured to further include detecting rotation of the moving body. The correcting of the velocity vector may include changing the size of the velocity vector when the moving body rotates.

According to the third aspect of the invention, correction to an appropriate velocity vector corresponding to the motion at the time of rotation of the moving body can be performed by changing the size of the velocity vector when the moving body rotates.

According to a fourth aspect of the invention, a method of calculating a position of a moving body includes: detecting a movement direction of the moving body; calculating a velocity vector of the moving body using a detection result of an acceleration sensor installed in the moving body; calculating the position of the moving body using the velocity vector; and correcting the calculated position using the detected movement direction.

Moreover, according to another aspect of the invention, a position calculating device installed in a moving body to calculate a position of the moving body includes: an acceleration sensor; a movement direction detecting section which detects a movement direction of the moving body; a velocity vector calculating section which calculates a velocity vector of the moving body using a detection result of the acceleration sensor; a position calculating section which calculates the position of the moving body using the velocity vector calculated by the velocity vector calculating section; and a position correcting section which corrects the position calculated by the position calculating section using the detected movement direction.

According to the fourth aspect and the like of the invention, since the velocity vector of a moving body is calculated using the detection result of the acceleration sensor installed in the moving body, the position can be calculated using the velocity vector. In addition, the calculated position is corrected using the movement direction of the moving body. Also in this case, the accuracy of position calculation using inertial navigation can be improved in the same manner as in the first aspect and the like of the invention described previously.

Moreover, according to a fifth aspect of the invention, the method according to any of the first to fourth aspects of the invention may be configured to further include: calculating a posture of the moving body using a detection result of a gyro sensor installed in the moving body; and performing coordinate transformation of the detection result of the acceleration sensor to an absolute direction by coordinate transformation of a relative detection direction of the acceleration sensor with respect to the moving body to the absolute direction using the calculated posture. In the calculating of the velocity vector, the velocity vector is calculated using a detection result after the coordinate transformation.

In this case, the posture of a moving body is calculated using the detection result of the gyro sensor installed in the moving body. In addition, by performing coordinate transformation of the relative detection direction of the acceleration sensor with respect to the moving body to the absolute direction using the calculated posture, coordinate transformation of the detection result of the acceleration sensor to the absolute direction is performed. Then, a velocity vector is calculated using the detection result of the acceleration sensor after the coordinate transformation. As a result, it becomes possible to calculate a velocity vector with an absolute direction which is obtained by correcting the detection direction of the acceleration sensor on the basis of the posture detected by the gyro sensor, for example, instead of the relative detection direction of the acceleration sensor.

Moreover, according to a sixth aspect of the invention, the method according to any of the first to fifth aspects of the invention may be configured such that the moving body is a vehicle.

BRIEF DESCRIPTION OF THE DRAWINGS

The invention will be described with reference to the accompanying drawings, wherein like numbers reference like elements.

FIG. 7 is a view showing an example of the data configuration of corrected velocity vector data.

FIG. 8 is a view showing an example of the data configuration of computed position data.

DESCRIPTION OF EXEMPLARY EMBODIMENTS

Hereinafter, embodiments of a position calculating system and a position calculating device installed in a moving body in order to calculate the position of the moving body will be described with reference to the accompanying drawings. In addition, it is not necessary to say that embodiments, to which the invention can be applied, are not limited to the embodiments which will be described below.

1. System Configuration

Figure 1:
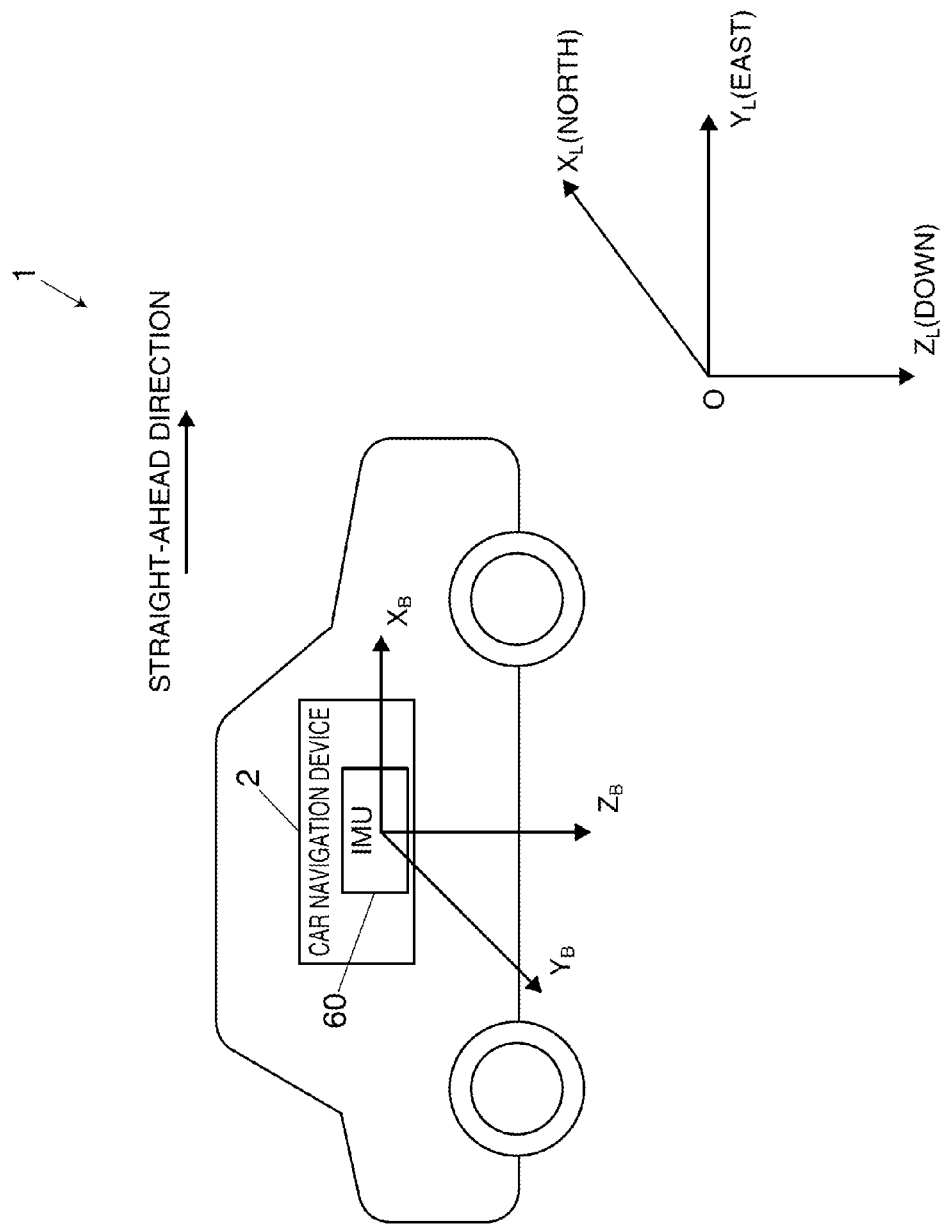
FIG. 1 is an explanatory view of the system configuration and coordinate system of a position calculating system.

FIG. 1 is an explanatory view of the system configuration and coordinate system of a position calculating system 1 in the present embodiment. In the position calculating system 1, a car navigation device 2 which is a kind of an electronic apparatus including a position calculating device is mounted in a four-wheel vehicle (hereinafter, simply referred to as a "vehicle") which is a moving body.

An IMU 60, which is a sensor unit including an acceleration sensor and a gyro sensor, is mounted in the car navigation device 2. The IMU 60 is installed and configured to detect and output the acceleration and the angular velocity in a relative coordinate system with respect to the vehicle. In the present embodiment, the following explanation will be given assuming that the car navigation device 2 is installed and fixed in a vehicle at a posture where the relative coordinate system is matched with a B coordinate system known as a Body Frame. The B coordinate system is a three-dimensional Cartesian coordinate system in which a back and forth direction (front direction with respect to a vehicle is positive) is an $X_B$ axis (roll axis), a left and right direction (right direction is positive) is a $Y_B$ axis (pitch axis), and a vertical direction (vertically downward direction is positive) is a $Z_B$ axis (yaw axis).

The car navigation device 2 calculates a position by performing two kinds of operation including a position calculation operation using a GPS (Global Positioning System) and an inertial navigation operation using a detection result of the IMU 60. In the present embodiment, an L coordinate system which is a kind of absolute coordinate system and is known as an NED (North East Down) coordinate system is used as a coordinate system for performing position calculation. The L coordinate system is a three-dimensional Cartesian coordinate system in which a north and south direction (north direction is positive) is an $X_L$ axis, an east and west direction (east direction is positive) is a $Y_L$ axis, and a height direction (vertically downward direction is positive) is a $Z_L$ axis.

The car navigation device 2 calculates a coordinate transformation matrix for coordinate transformation from the B coordinate system to the L coordinate system on the basis of a detection result of the gyro sensor and performs coordinate transformation of a detection result of the acceleration sensor in the B coordinate system (relative coordinate system) into a detection result in the L coordinate system (absolute coordinate system) using the coordinate transformation matrix. When performing coordinate transformation, coordinate transformation of the direction of acceleration, among detection results of the acceleration sensor, is performed and the rate of acceleration is maintained. In other words, coordinate transformation of the relative detection direction of the acceleration sensor into a direction (absolute direction) in the absolute coordinate system is performed.

In addition, navigation processing of calculating the position of the vehicle in a sequential manner (updating the computed position) by performing an inertial navigation operation using the detection result of the acceleration sensor and the detection result of the gyro sensor in the L coordinate system and displaying a navigation screen, which is obtained by plotting the calculated position (computed position), on a display section is performed. Moreover, in the present embodiment, the position calculated using an inertial navigation operation is referred to as a "computed position" so that it can be distinguished from the position calculated by a GPS position calculating section 20, which will be described later.

2. Functional Configuration

Figure 2:
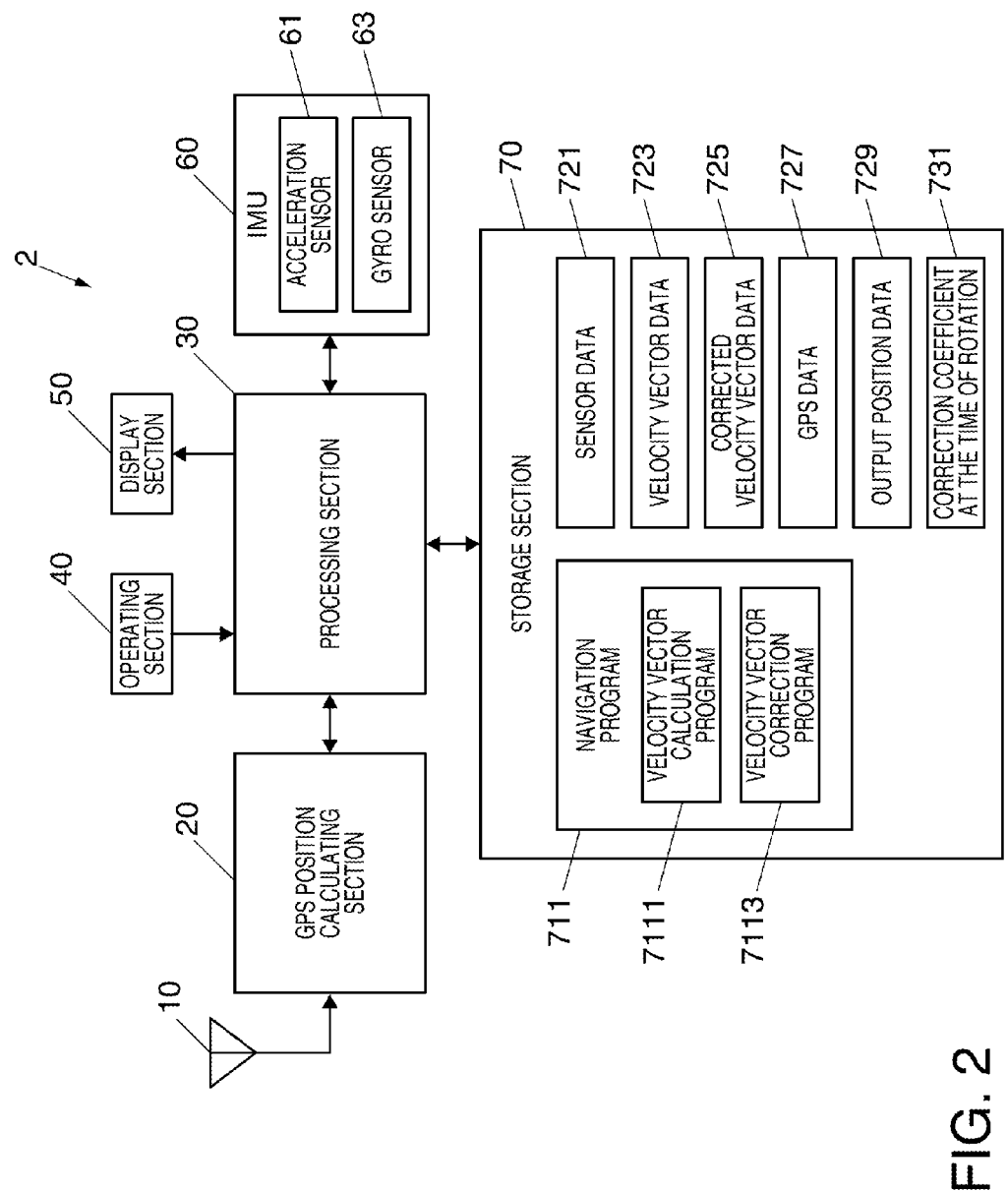
FIG. 2 is a block diagram showing an example of the functional configuration of a car navigation device.

FIG. 2 is a block diagram showing an example of the functional configuration of the car navigation device 2. The car navigation device 2 includes a GPS antenna 10, the GPS position calculating section 20, a processing section 30, an operating section 40, a display section 50, an IMU (Inertial Measurement Unit) 60, and a storage section 70.

The GPS antenna 10 is an antenna that receives an RF (Radio Frequency) signal including a GPS satellite signal transmitted from a GPS satellite, which is a kind of positioning satellite, and outputs the received signal to the GPS position calculating section 20. The GPS satellite signal is a communication signal with a frequency of 1.57542 [GHz] that is modulated by the CDMA (Code Division Multiple Access) method, which is known as a spread spectrum method, using a CA (Coarse/Acquisition) code which is a kind of spread code. The CA code is a pseudo random noise code, which has a code length of 1023 chips as 1 PN frame and has a repetition period of 1 ms, and differs with each GPS satellite.

The GPS position calculating section 20 is a circuit or a device which measures the position of a vehicle (car navigation device 2) on the basis of a signal output from the GPS antenna 10, and is also a functional block equivalent to a so-called GPS receiver. Although not shown in the drawing, the GPS position calculating section 20 includes an RF receiving circuit section and a baseband processing circuit section. In addition, the RF receiving circuit section and the baseband processing circuit section may be manufactured as separate LSIs (large scale integration) or may be manufactured as one chip.

The baseband processing circuit section captures and tracks a GPS satellite signal by performing correlation processing or the like on the reception signal output from the RF receiving circuit section, and calculates the position (coordinate position) of a vehicle by performing predetermined position calculation on the basis of satellite orbit data, time information, and the like extracted from the GPS satellite signal. Then, the baseband processing circuit section outputs the calculated position to the processing section 30 as GPS data 727.

The processing section 30 is a controller which performs overall control of the sections of the car navigation device 2 according to various kinds of programs, such as a system program, stored in the storage section 70, and includes a processor, such as a CPU (Central Processing Unit). The processing section 30 calculates the position (position coordinates) of a vehicle by performing inertial navigation operation processing using the detection result of the IMU 60. In addition, the processing section 30 performs processing for making the display section 50 display a map indicating the current position on the basis of the position calculated by the GPS position calculating section 20 (GPS calculation position) and the position calculated by the processing section 30 (inertial navigation operation position).

Figure 3:
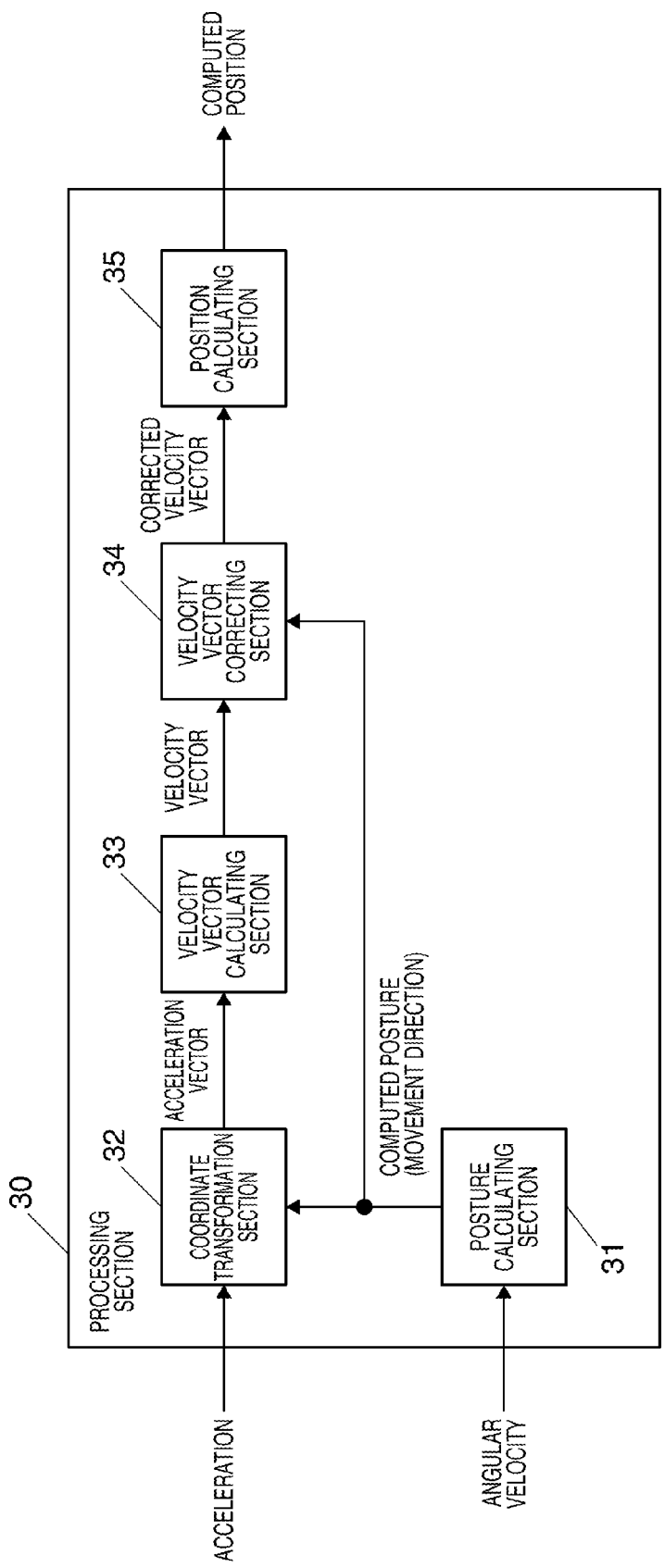
FIG. 3 is a conceptual view showing a processing section as a functional block.

FIG. 3 is a conceptual view showing the processing section 30 as a functional block. The processing section 30 includes a posture calculating section 31, a coordinate transformation section 32, a velocity vector calculating section 33, a velocity vector correcting section 34, and a position calculating section 35 as functional sections.

The posture calculating section 31 calculates a posture angle of a vehicle by performing integration processing (integration and cumulative addition) of the acceleration of three axes in the B coordinate system which is detected by a gyro sensor 63. The posture calculating section 31 outputs the calculated posture angle to the coordinate transformation section 32 and the velocity vector correcting section 34 as a computed posture. If the posture of a vehicle is known, the movement direction of the vehicle is also known. Therefore, the posture calculating section 31 may also be said to be a movement direction detector which detects the movement direction of a vehicle.

The coordinate transformation section 32 performs coordinate transformation processing for transforming the detection result of the IMU 60 in the B coordinate system into the detection result in the L coordinate system on the basis of the computed posture input from the posture calculating section 31. Specifically, the coordinate transformation section 32 calculates a coordinate transformation matrix for coordinate transformation from the B coordinate system to the L coordinate system using the posture angles of three axes in the B coordinate system input from the posture calculating section 31, and transforms the detection result of an acceleration sensor 61 using the coordinate transformation matrix. Then, the coordinate transformation section 32 outputs the transformed acceleration of three axes in the L coordinate system to the velocity vector calculating section 33 as an acceleration vector of the car navigation device 2. It may also be said that the coordinate transformation section 32 is an acceleration vector calculating section.

The velocity vector calculating section 33 calculates a velocity vector of the car navigation device 2 by performing integration processing of the acceleration vector input from the coordinate transformation section 32 and outputs the calculated velocity vector to the velocity vector correcting section 34.

The velocity vector correcting section 34 corrects the velocity vector input from the velocity vector calculating section 33 on the basis of the computed posture input from the posture calculating section 31. Then, the velocity vector correcting section 34 outputs the corrected velocity vector to the position calculating section 35.

The position calculating section 35 calculates the position of the car navigation device 2 using the corrected velocity vector input from the velocity vector correcting section 34. Then, the position calculating section 35 outputs the calculated position to the display section 50.

Figure 4A:
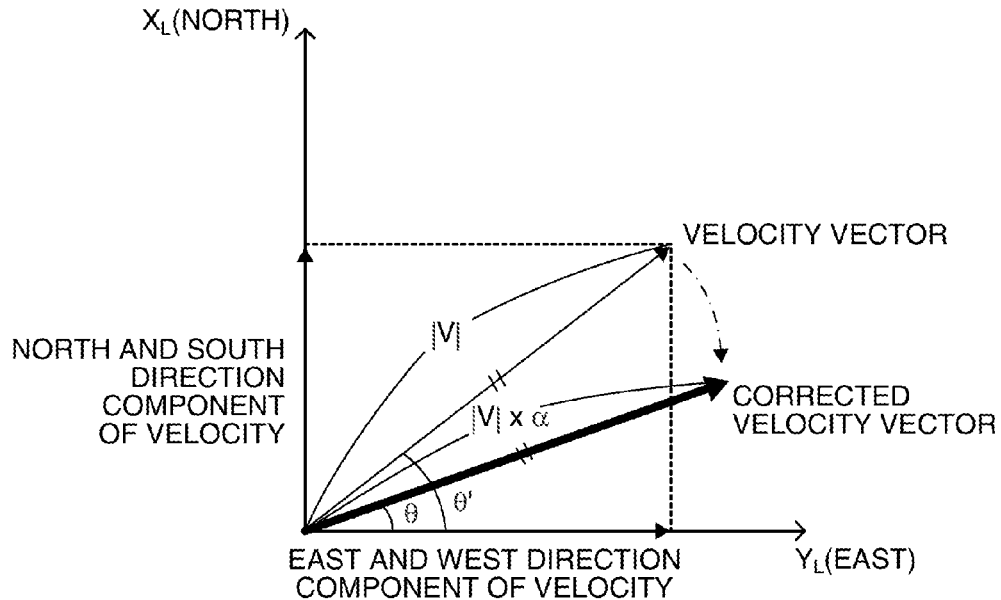
FIG. 4A is an explanatory view of velocity vector correction at the time of moving straight ahead.
Figure 4B:
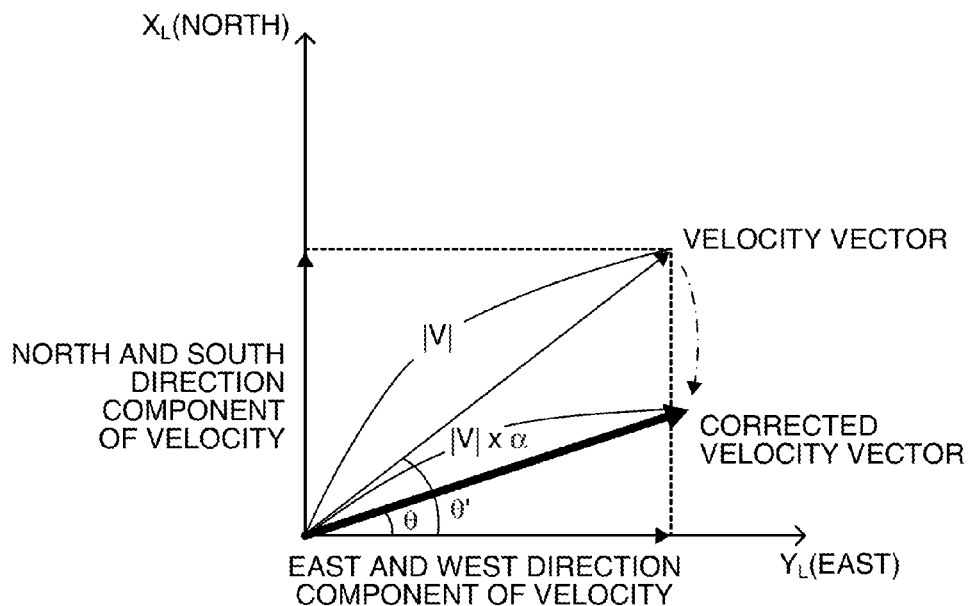
FIG. 4B is an explanatory view of velocity vector correction at the time of rotation.

Referring to FIGS. 4A and 4B, the principle of velocity vector correction in the present embodiment will be described. Here, the case of correcting a velocity vector on the two-dimensional plane having the east and west direction ($Y_L$ axis) and the north and south direction ($X_L$ axis) in the L coordinate system is shown and described for easy understanding. FIG. 4A is an explanatory view of the correction of a velocity vector when a vehicle moves straight ahead, and FIG. 4B is an explanatory view of correction of a velocity vector at the time of rotation (turning) of a vehicle. In each drawing, the horizontal axis indicates the $Y_L$ axis and the vertical axis indicates the $X_L$ axis.

By integration processing of an east and west direction component and a north and south direction component of the acceleration in the L coordinate system, an east and west direction component and a north and south direction component of the velocity are obtained. In FIGS. 4A and 4B, arrows shown on the $Y_L$ axis indicate the east and west direction component of the velocity, and arrows shown on the $X_L$ axis indicate the north and south direction component of the velocity. By composition of the east and west direction component and the north and south direction component of the velocity, a velocity vector with a size of |V| and a direction of θ' is obtained. That is, a velocity vector is defined in the circular coordinates having a radius of |V| and a declination of θ'. In FIGS. 4A and 4B, the direction of a velocity vector is expressed by an angle between the velocity vector and the $Y_L$ axis. The above-described velocity vector is a velocity vector calculated by the velocity vector calculating section 33.

The velocity vector is calculated by integration processing of an acceleration vector in the L coordinate system which is output from the coordinate transformation section 32. More specifically, by integration and cumulative addition of a plurality of acceleration vectors detected for a predetermined unit time (unit period), displacement of the velocity vector in the unit period is calculated. Then, by adding (cumulatively adding) it to the previous (newest) velocity vector, the velocity vector is newly calculated. In addition, a change of a vector (vector expressed by "dv" in Expression (1)) equivalent to the change of a velocity vector in a unit period is called "displacement" of a current velocity vector to a previous velocity vector for the sake of convenience. In addition, a plurality of detection intervals is included in the unit period (that is, a plurality of acceleration vectors is detected during the unit period).

Thus, since it is necessary to calculate a velocity vector sequentially by integration and cumulative addition of acceleration vectors, there is a problem in that error is accumulated in the calculated velocity vector if there is an error in the acceleration vector. If an east and west direction component of the velocity and a north and south direction component of the velocity are not calculated correctly, the size and direction of the velocity vector shown in FIGS. 4A and 4B are not calculated correctly. As a result, an error may be included.

Therefore, the size and direction of a velocity vector are corrected as follows. First, the direction θ' of a velocity vector is corrected to a movement direction θ of the car navigation device 2 calculated by the posture calculating section 31. The direction θ' of a velocity vector is a direction which is calculated indirectly through integration processing of acceleration vectors, while the movement direction θ is a direction of a vehicle which is directly calculated from the detection result of a sensor. Accordingly, the direction of a corrected velocity vector becomes a correct direction along the movement direction of a vehicle.

Then, the size |V| of the velocity vector is corrected to |V|×α. Here, "α" is a correction coefficient of a velocity vector. In the present embodiment, the correction coefficient "α" is set to be variable at the time of moving straight ahead and rotation of a vehicle in order to correct a velocity vector. Specifically, when a vehicle moves straight ahead, the correction coefficient is set to 1 (α=1) and the size of a velocity vector is maintained as it is as shown in FIG. 4A. In this case, the size of the velocity vector and the size of a corrected velocity vector are the same.

On the other hand, at the time of rotation of a vehicle, the correction coefficient is set to be smaller than 1 (α<1) and the size of the velocity vector is corrected to become small as shown in FIG. 4B. In this case, the size of a corrected velocity vector becomes smaller than the size of the velocity vector.

Although described later through the experimental result, it could be seen from the result of experiments performed under various conditions by the inventor of this application that the effect of velocity vector correction was acquired by setting the correction coefficient "α" to a value, which was slightly smaller than "1", and this contributed to an improvement in the accuracy of position calculation. For example, if position calculation is performed in a state where the size of a velocity vector is maintained as it is when a vehicle turns a corner, the calculated position goes too far straight ahead even though the vehicle is actually turning a corner. As a result, there is a problem in that traceability becomes worse. In order to cope with this problem, in the present embodiment, the position calculation is performed by estimating the size of a velocity vector to be slightly small at the time of rotation of the vehicle. In addition, examples of rotation of a vehicle include rotation short of a complete circle, such as right turn, left turn, and turning of a vehicle.

Although the two-dimensional plane was considered for easy understanding in FIGS. 4A and 4B, it may be easily extended to a three-dimensional space. In this case, it is preferable to perform the same correction in consideration of a vertical direction in addition to the direction of a vehicle on the two-dimensional plane of north, south, east, and west. That is, a velocity vector is defined in the spherical coordinates having a radius of |V| and a declination of (θ', φ'). In addition, the direction of the velocity vector is corrected to a posture angle (θ, φ) calculated by the posture calculating section 31, and the size of the velocity vector is corrected to |V|×α.

Returning to the explanation of the functional block shown in FIG. 2, the operating section 40 is an input device configured to include a touch panel or a button switch, for example, and outputs a signal corresponding to a pressed key or button to the processing section 30. By the operation of the operating section 40, various kinds of instruction input, such as input of a destination, are performed.

The display section 50 is a display device formed by using an LCD (Liquid Crystal Display), for example, and performs various kinds of display on the basis of a display signal input from the processing section 30. A navigation screen or the like is displayed on the display section 50.

The IMU 60 includes the acceleration sensor 61 or the gyro sensor 63, for example, and is configured to be able to detect the acceleration in each axial direction of three axes, which are perpendicular to each other, in the sensor coordinate system set in advance corresponding to a sensor and the angular velocity around each axis. In addition, the acceleration sensor 61 and a gyro sensor 63 may be separate sensors or may be an integrated sensor.

The storage section 70 is formed by using storage devices, such as a ROM (Read Only Memory) or a flash ROM and a RAM (Random Access Memory), and stores a system program of the car navigation device 2, various programs or data used to realize various functions involving a navigation function, and the like. In addition, the storage section 70 has a work area where the data being processed, a processing result, and the like in various kinds of processing are temporarily stored.

The position calculating device of the present embodiment is configured to include at least the processing section 30 and the acceleration sensor 61. In addition, the position calculating device may include other configurations, such as the GPS antenna 10, the GPS position calculating section 20, the operating section 40, the display section 50, the gyro sensor 63, and the storage section 70.

3. Data Configuration

As shown in FIG. 2, a navigation program 711 which is read by the processing section 30 and executed as navigation processing (refer to FIG. 9) is stored in the storage section 70 as a program. In addition, a velocity vector calculation program 7111 executed as velocity vector calculation processing (refer to FIG. 10) and a velocity vector correction program 7113 executed as velocity vector correction processing (refer to FIG. 11) are included in the navigation program 711 as a subroutine.

The navigation processing is a processing when the processing section 30 computes a corrected velocity vector for performing an inertial navigation operation by performing velocity vector calculation processing and velocity vector correction processing and calculates the position of a vehicle (car navigation device 2) using the corrected velocity vector. Then, the processing section 30 generates a navigation screen, on which the computed position is plotted, and displays the navigation screen on the display section 50.

The velocity vector calculation processing is a processing when the velocity vector calculating section 33 calculates a velocity vector of a vehicle by integration processing of an acceleration vector coordinate-transformed from the B coordinate system to the L coordinate system by the coordinate transformation section 32.

In addition, the velocity vector correction processing is a processing when the velocity vector correcting section 34 corrects a velocity vector calculated by the velocity vector calculating section 33 using the movement direction of the vehicle calculated by the posture calculating section 31. Details of these processings will be described later using a flow chart.

In addition, sensor data 721, velocity vector data 723, corrected velocity vector data 725, GPS data 727, output position data 729, and a correction coefficient at the time of rotation 731 are stored in the storage section 70 as data.

Figure 5:
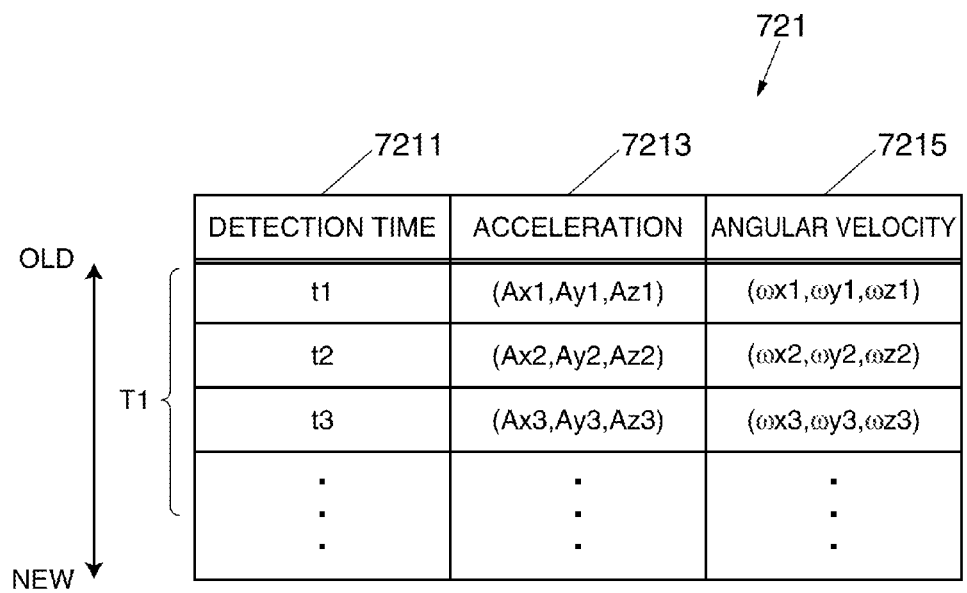
FIG. 5 is a view showing an example of the data configuration of sensor data.

The sensor data 721 is data in which the acceleration and the angular velocity detected by the acceleration sensor 61 and the gyro sensor 63, which form the IMU 60, are stored in a time series, and an example of the data configuration is shown in FIG. 5. In the sensor data 721, three-dimensional acceleration 7213 and a three-dimensional angular velocity 7215 are stored in a time series so as to match a detection time 7211 of the IMU 60.

Figure 6:
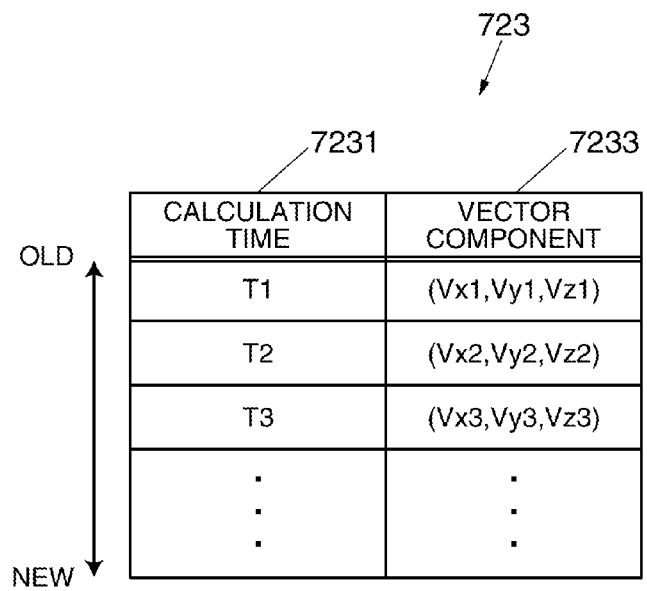
FIG. 6 is a view showing an example of the data configuration of velocity vector data.

The velocity vector data 723 is data of a velocity vector calculated by velocity vector calculation processing, and an example of the data configuration is shown in FIG. 6. In the velocity vector data 723, a vector component 7233 of a velocity vector when the L coordinate system, which is a Cartesian coordinate system, is assumed is stored in a time series so as to match a calculation time 7231 of the velocity vector. A velocity vector of calculation time "T1" is calculated by the acceleration data of detection time "t1, t2, t3 . . . " in a predetermined time of the sensor data 721.

The corrected velocity vector data 725 is data of a corrected velocity vector calculated in velocity vector correction processing, and an example of the data configuration is shown in FIG. 7. In the corrected velocity vector data 725, size 7253 and direction 7255 of a corrected velocity vector when a spherical coordinate system is assumed and a vector component 7257 of a corrected velocity vector when the L coordinate system, which is a Cartesian coordinate system, is assumed are stored in a time series so as to match the calculation time 7231 of the velocity vector.

The size 7253 of a corrected velocity vector is calculated by the square root of sum of squares of the vector component 7233 of the velocity vector of the velocity vector data 723. That is, it is $|V|=(Vx^2+Vy^2+Vz^2)^{1/2}$. On the other hand, the direction 7255 of a velocity vector is a computed posture (θ, φ) of a vehicle calculated and determined by the posture calculating section 31.

The GPS data 727 is data in which the position (hereinafter, referred to as "GPS computation position") calculated and determined by the GPS position calculating section 20 is stored in a time series. The GPS data 727 is updated at predetermined intervals (for example, every 10 minutes).

The output position data 729 is data of the output position displayed on the display section 50, and an example of the data configuration is shown in FIG. 8. In the output position data 729, an output position 7293 and a positioning type 7295 are stored so as to match the calculation time 7231 of a velocity vector.

The positioning type 7295 is a flag indicating whether the output position 7293 is a position calculated by the GPS position calculating section 20 or a position calculated by the position calculating section 35. "GPS" is stored when the output position 7293 is a position calculated by the GPS position calculating section 20, and "inertial navigation" is stored when the output position 7293 is a position calculated by the position calculating section 35.

The correction coefficient at the time of rotation 731 is data of coefficients for correcting the size 7253 of a velocity vector when the rotation of a vehicle is detected. Details thereof will be described later.

4. Flow of Processing

Figure 9:
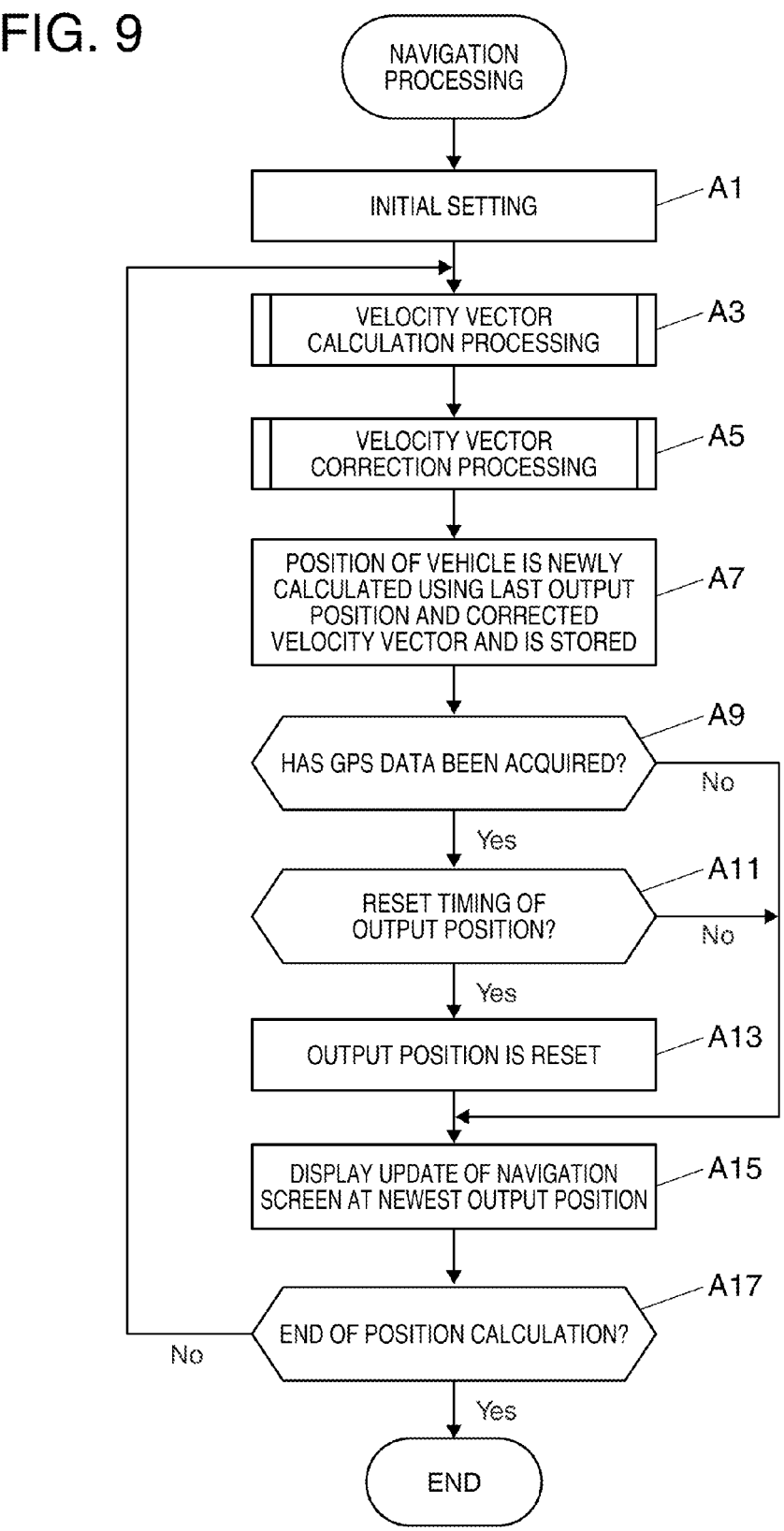
FIG. 9 is a flow chart showing the flow of navigation processing.

FIG. 9 is a flow chart showing the flow of navigation processing which is executed in the car navigation device 2 when the navigation program 711 stored in the storage section 70 is read and executed by the processing section 30. In the following navigation processing, it is assumed that the acceleration and the angular velocity detected by the IMU 60 are stored in the sensor data 721 of the storage section 70 when necessary.

First, the processing section 30 performs initial setting (step A1). Specifically, each parameter used in the inertial navigation operation is initialized. Then, the processing section 30 performs velocity vector calculation processing by reading and executing the velocity vector calculation program 7111 stored in the storage section 70 (step A3).

Figure 10:
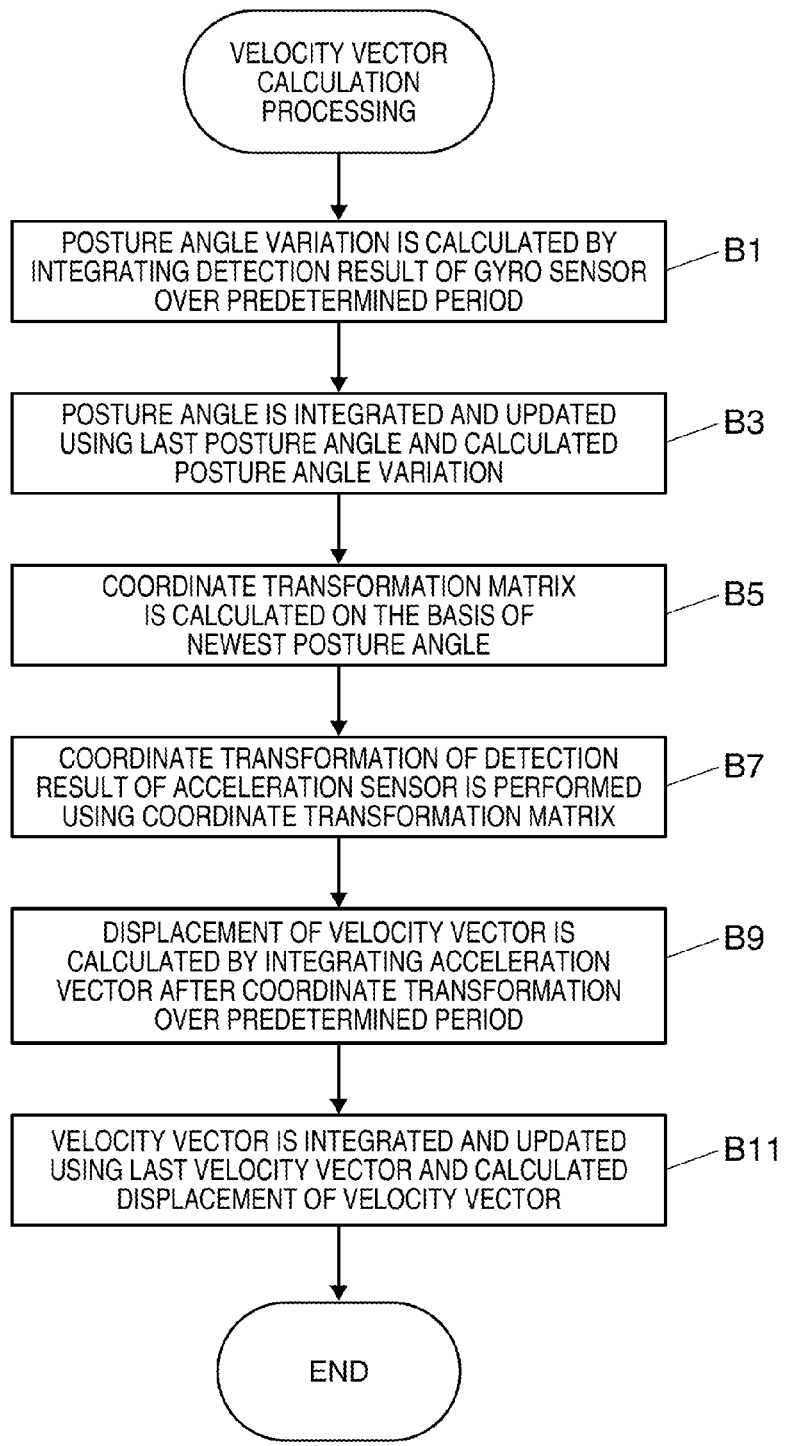
FIG. 10 is a flow chart showing the flow of velocity vector calculation processing.

FIG. 10 is a flow chart showing the flow of velocity vector calculation processing.

First, the posture calculating section 31 integrates a detection result of the gyro sensor 63 over a predetermined period to calculate a posture angle variation for the predetermined period (step B1). Then, the posture calculating section 31 newly calculates (cumulatively adds) the posture angle using the last (newest) posture angle and the calculated posture angle variation and update the last posture angle with the newly calculated posture angle (step B3).

Then, the coordinate transformation section 32 calculates a coordinate transformation matrix for coordinate transformation from the B coordinate system to the L coordinate system on the basis of the newest posture angle (step B5). In addition, since the coordinate transformation matrix for coordinate transformation from the B coordinate system to the L coordinate system is known in the related art, a detailed explanation using expression and the like will be omitted.

Then, the coordinate transformation section 32 performs coordinate transformation of a detection result of three axes in the B coordinate system, which is detected by the acceleration sensor 61, to a detection result of three axes in the L coordinate system using the coordinate transformation matrix calculated in step B5 (step B7). As a result, an acceleration vector of three axes in the L coordinate system is calculated. Then, the coordinate transformation section 32 integrates the acceleration vector calculated in step B7 over a predetermined period to calculate the displacement of a velocity vector in the predetermined period (step B9).

Then, the velocity vector calculating section 33 newly calculates a velocity vector using the last (newest) velocity vector and the displacement of the velocity vector calculated in step B9, and updates the velocity vector data 723 of the storage section 70 (step B11). Specifically, the velocity vector calculating section 33 newly calculates a velocity vector by summing (cumulatively adds) the displacement of the velocity vector calculated in step B9 to the last (newest) velocity vector. Then, the velocity vector calculating section 33 ends the velocity vector calculation processing.

After returning to the navigation processing shown in FIG. 9 to perform velocity vector calculation processing, the velocity vector correcting section 34 performs velocity vector correction processing by reading and executing the velocity vector correction program 7113 stored in the storage section 70 (step A5).

Figure 11:
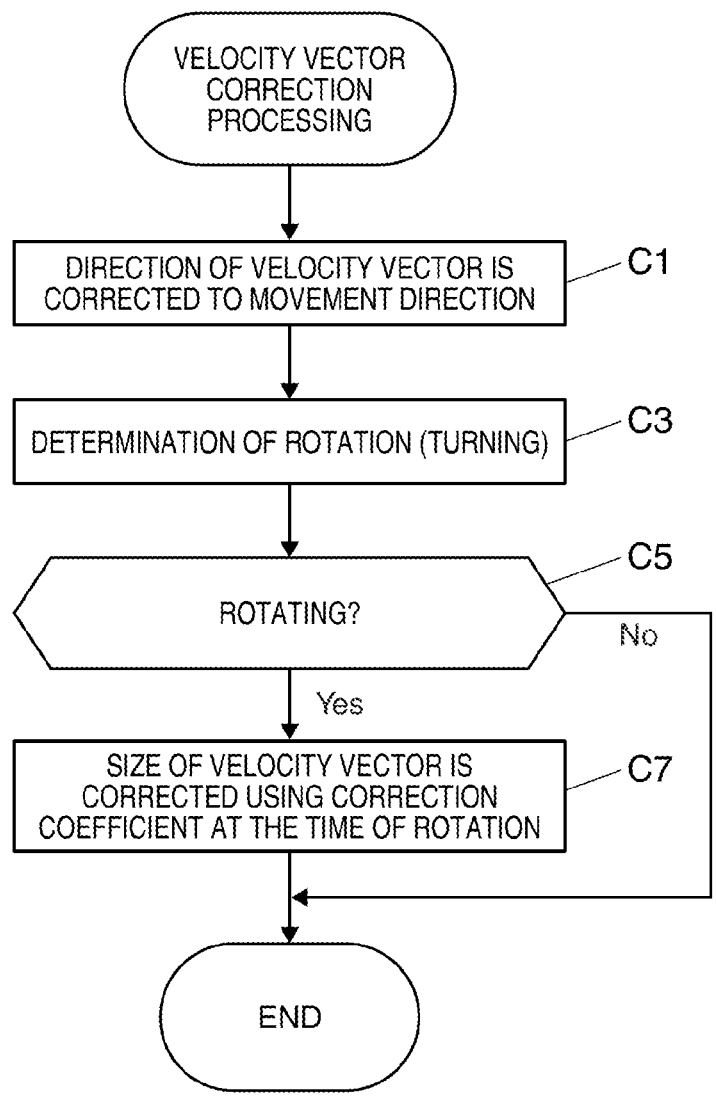
FIG. 11 is a flow chart showing the flow of velocity vector correction processing.

FIG. 11 is a flow chart showing the flow of velocity vector correction processing. First, the velocity vector correcting section 34 updates the corrected velocity vector data 725 of the storage section 70 by correcting the direction 7255 of the velocity vector calculated in velocity vector calculation processing to the movement direction of the vehicle acquired from the posture angle calculated in step B3 (step C1).

Then, the velocity vector correcting section 34 performs rotation (turning) determination of the vehicle (step C3). Specifically, the velocity vector correcting section 34 determines whether or not the vehicle is rotating on the basis of a temporal change of the posture angle calculated in step B3 from the last posture angle, for example. In addition, the rotation determination may also be performed by using the angular velocity itself detected by the gyro sensor 63.

When the rotation of a vehicle is detected (step C5; Yes), the velocity vector correcting section 34 updates the corrected velocity vector data 725 by correcting the size 7253 of the velocity vector using the correction coefficient at the time of rotation 731 ($\alpha<1$) which is stored in the storage section 70 and is set in advance as a correction coefficient at the time of rotation (step C7). And the velocity vector correcting section 34 ends the velocity vector correction processing.

In addition, when the rotation of a vehicle is not detected (step C5; No), the velocity vector correcting section 34 ends the velocity vector correction processing without correcting the size of the velocity vector.

After returning to the navigation processing shown in FIG. 9 to perform velocity vector correction processing, the position calculating section 35 newly calculates the position of the vehicle using the last (newest) output position and the corrected velocity vector calculated in velocity vector correction processing and stores it in the output position data 729 of the storage section 70 (step A7).

Then, the position calculating section 35 determines whether or not the GPS data 727 has been acquired from the GPS position calculating section 20 (step A9). When it is determined that the GPS data 727 has been acquired from the GPS position calculating section 20 (step A9; Yes), the position calculating section 35 determines whether or not it is a reset timing of the output position (step A11).

Various kinds of timing may be set as the reset timing of the output position. For example, it may be a timing at which a vehicle has stopped. Stopping of a vehicle may be determined on the basis of the size of a velocity vector, for example. That is, when the size of a velocity vector is a value close to "0" and is equal to or less than a predetermined threshold value set in advance, it can be determined that the vehicle has stopped.

Moreover, for example, a timing at which the vehicle environment is changed from the environment where positioning using a GPS is not possible, such as "inside a tunnel", to the environment where positioning using a GPS is possible, such as "outside a tunnel" (timing at which capturing of a GPS satellite signal becomes possible from a time at which capturing of a GPS satellite signal is not possible), may also be set as a reset timing. Alternatively, for example, a timing whenever a predetermined time elapses (for example, every 30 minutes) may be set as a reset timing.

When the position calculating section 35 determines that it is a reset timing of the output position (step A11; Yes), the position calculating section 35 resets the output position calculated in step A7 by the GPS calculation position of the GPS data 727 acquired from the GPS position calculating section 20 (step A13). Specifically, the position calculating section 35 changes the output position calculated in step A7 to the GPS calculation position.

On the other hand, when it is determined that the GPS data could not been acquired in step A9 (step A9; No) or when it is determined that it is not a reset timing in step A11 (step A11; No), the position calculating section 35 proceeds to step A15.

Then, the position calculating section 35 updates the display of a navigation screen of the display section 50 at the newest output position (computed position) (step A15). Then, the position calculating section 35 determines whether or not to end the position calculation (step A17). If it is determined to end the position calculation yet (step A17; No), the process returns to step A3. If it is determined not to end the position calculation (step A17; Yes), the navigation processing is ended.

5. Experimental Results

Figure 12:
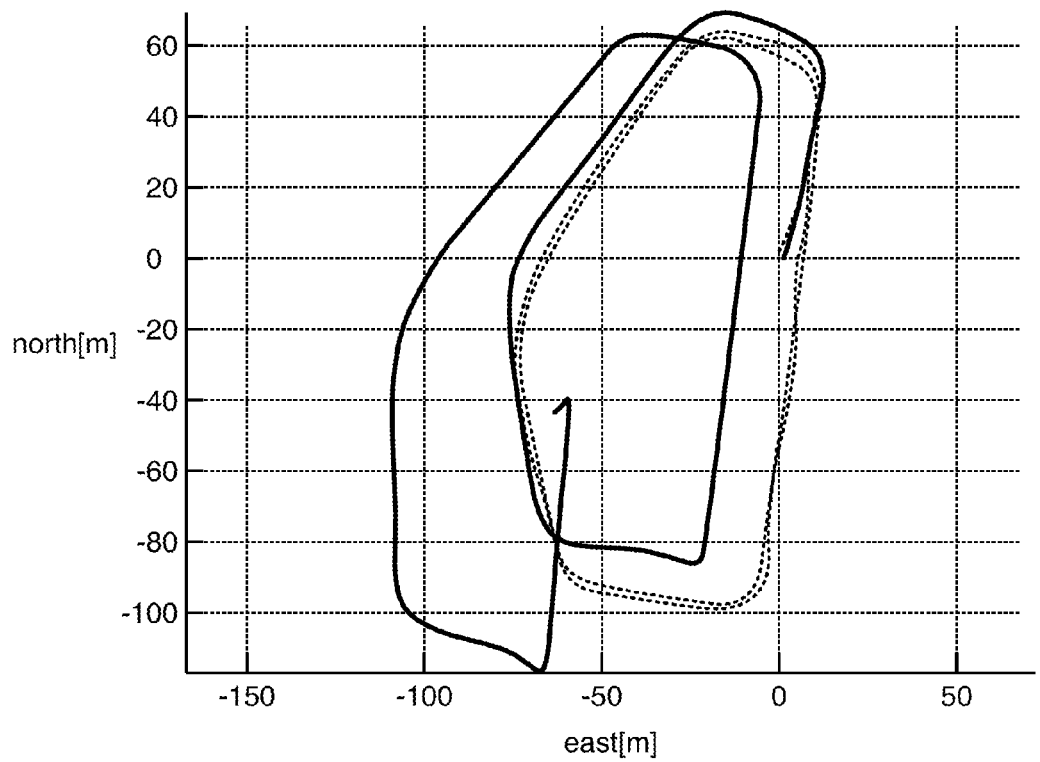
FIG. 12 is a view showing an example of an experimental result obtained by performing position calculation using a known method.
Figure 13:
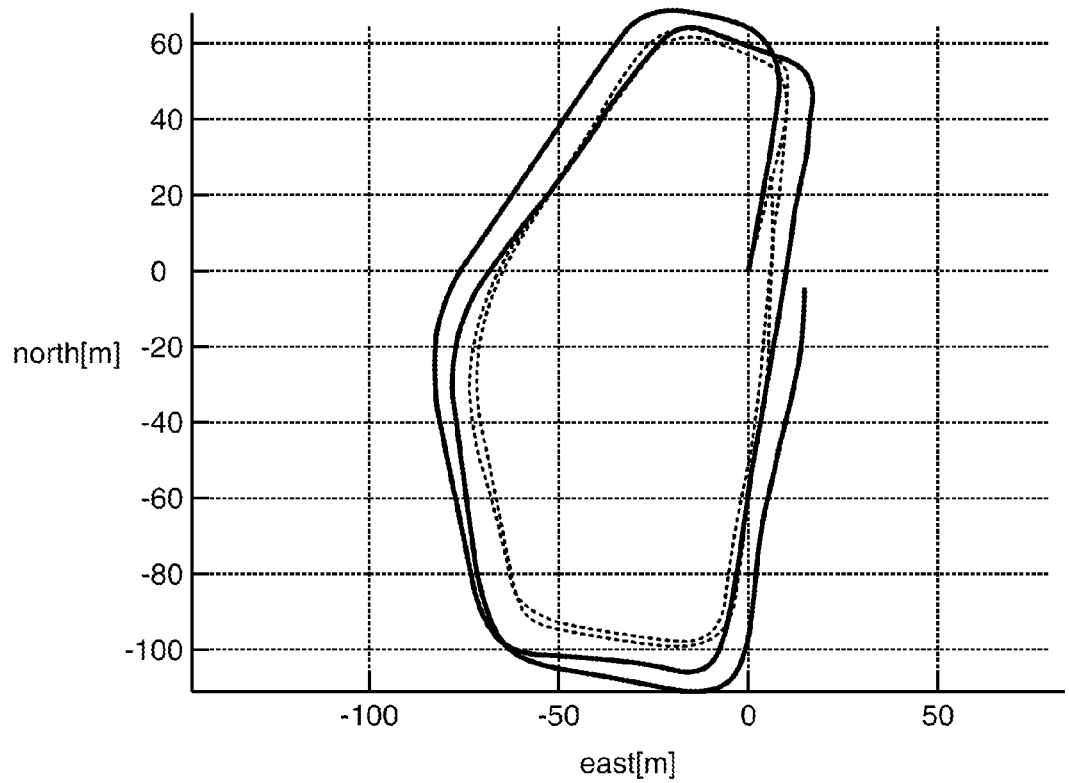
FIG. 13 is a view showing an example of an experimental result obtained by performing position calculation using a method of the embodiment.
Figure 14:
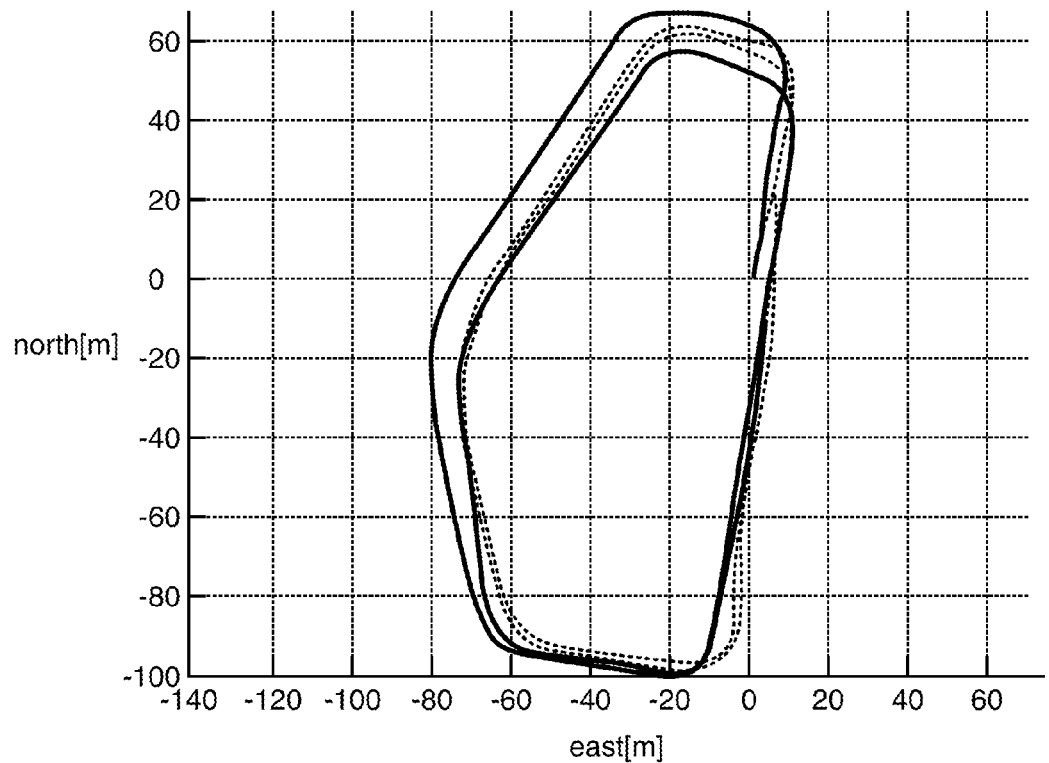
FIG. 14 is a view showing an example of an experimental result obtained by performing position calculation using a method of the embodiment.

Referring to FIGS. 12 to 14, experimental results obtained by performing position calculation by applying a known method and a method of the present embodiment will be described. An experiment of making a vehicle, in which a car navigation device was mounted, rotate twice around a circular path set in advance and sequentially plotting the computed positions acquired by performing an inertial navigation operation at predetermined intervals on the two-dimensional plane of north, south, east, and west was performed. In FIGS. 12 to 14, the horizontal axis indicates an east and west direction and the vertical axis indicates a north and south direction. In addition, a dotted line indicates an actual path and a thick solid line indicates the locus of computed positions.

FIG. 12 is a view showing an example of an experimental result when position calculation was performed without correcting a velocity vector using a method in the related art. From this result, it can be seen that the locus of computed positions along the actual path is obtained in the early stage of the first round, but the computed position deviates from the actual path from the middle of the first round and largely deviates from the actual path in the second round.

FIG. 13 is a view showing an example of an experimental result when position calculation was performed by correcting a velocity vector using the method of the present embodiment. Here, an experiment was performed in a state where the correction coefficient of a velocity vector was always set as "α=1" without correcting the size of the velocity vector at the time of rotation of a vehicle. This result shows that there is also an error compared with the actual path, but the locus of computed positions near the actual path is obtained compared with the result in the related art shown in FIG. 12. However, a close view shows that the computed position deviates too far outwards in a corner section and accordingly, the traceability in the corner becomes worse.

FIG. 14 is a view showing an example of an experimental result when position calculation was performed by correcting a velocity vector using the method of the present embodiment. Here, an experiment was performed in a state where the size of a velocity vector at the time of rotation of a vehicle was corrected and the correction coefficient "α" was set as a fixed value equal to or greater than 0.9 and smaller than 1.0 at the time of rotation. This result shows that a satisfactory result is obtained since the locus of computed positions almost matches the actual path even in the second round. In addition, focusing on the corner section, the computed position does not deviate outside and a locus along the actual path, which has good traceability, is obtained. Thus, the effectiveness of the method of the present embodiment was proved.

6. Operations and Effects

According to the present embodiment, the posture and the movement direction of a vehicle which is a moving body are detected using the detection result of the gyro sensor 63 installed in the vehicle. In addition, coordinate transformation of the detection result of the acceleration sensor 61 installed in the vehicle is performed from the relative coordinate system to the absolute coordinate system on the basis of the detected posture, and a velocity vector is calculated and updated using the detection result after coordinate transformation. Then, the calculated velocity vector is corrected using the detected movement direction, and the position of the vehicle is calculated and updated using the corrected velocity vector.

The velocity vector is calculated by integration processing of an acceleration vector. In this case, since processing of integrating and cumulatively adding acceleration vectors is performed, there is a problem in that error is accumulated in the calculated velocity vector as time elapses. However, if the direction of the calculated velocity vector is corrected to the movement direction of the vehicle detected by another detection method, the direction of the velocity vector becomes a correct direction along the movement direction of the vehicle. In addition, the accuracy of the computed position can be improved by calculating the position of a vehicle using the corrected velocity vector.

In addition, the size of a velocity vector is maintained as it is when a vehicle moves straight ahead, and the size of a velocity vector is corrected to become slightly small at the time of rotation of a vehicle. For example, when a vehicle turns a corner, traceability of the calculated position with respect to the actual position becomes worse if position calculation is performed in a state where the size of a velocity vector is maintained as it is. This causes a problem in that the calculated position deviates gradually from the actual position. For this reason, by performing the position calculation by estimating the size of a velocity vector to be slightly small at the time of rotation of a vehicle, the accuracy of the computed position can be improved.

7. Modifications 7-1. Electronic Apparatus

In the above embodiment, the case in which the invention is applied to the navigation device mounted in a four-wheel vehicle has been described as an example. However, the electronic apparatus to which the invention can be applied is not limited to this. For example, the invention may be applied to a navigation device mounted in a two-wheel vehicle or may be applied to a portable navigation device.

In addition, it is needless to say that the invention may be similarly applied to electronic apparatuses for applications other than navigation. For example, the invention may be similarly applied to other electronic apparatuses, such as a mobile phone, a personal computer, and a PDA (Personal Digital Assistant), so that position calculation of the electronic apparatuses can be realized.

7-2. Satellite Positioning System

In addition, the explanation has been made using the GPS as an example of the satellite positioning system. However, other satellite positioning systems, such as a WAAS (Wide Area Augmentation System), a QZSS (Quasi Zenith Satellite System), a GLONASS (Global Navigation Satellite System), and a GALILEO, may also be used.

7-3. Correction of a Position

Although a velocity vector is corrected on the basis of the movement direction of a vehicle and position calculation is performed using the corrected velocity vector in the embodiment described above, the following is also possible. That is, position calculation is performed using a velocity vector as it is without correcting the velocity vector. In addition, the calculated position is corrected on the basis of the movement direction of a vehicle.

Figure 15:
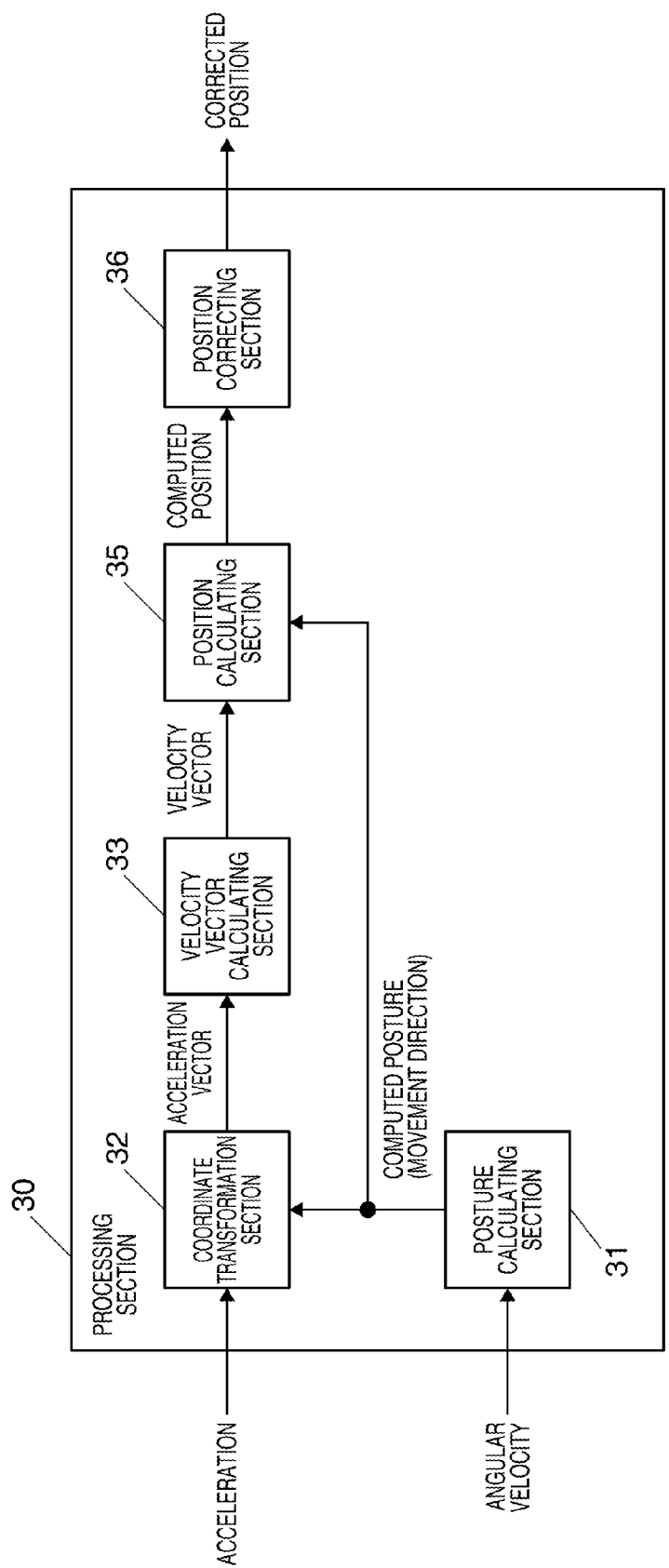
FIG. 15 is a conceptual view showing a processing section in a modification as a functional block.

FIG. 15 is a conceptual view showing the processing section 30 in this case as a functional block. In addition, the same components as in the processing section 30 shown in FIG. 3 are denoted by the same reference numerals and the explanation is omitted, and this explanation will be focused on a different functional block from FIG. 3. In the processing section 30 shown in FIG. 15, the computed posture (movement direction) calculated and determined by the posture calculating section 31 is output to the coordinate transformation section 32 and a position correcting section 36.

In addition, the velocity vector calculated by the velocity vector calculating section 33 is output to the position calculating section 35 as it is. Then, the position calculating section 35 calculates the position using the velocity vector. The position calculated by the position calculating section 35 is output to the position correcting section 36. Then, the position correcting section 36 corrects the position input from the position calculating section 35 on the basis of the computed posture (movement direction) input from the posture calculating section 31.

Figure 16:
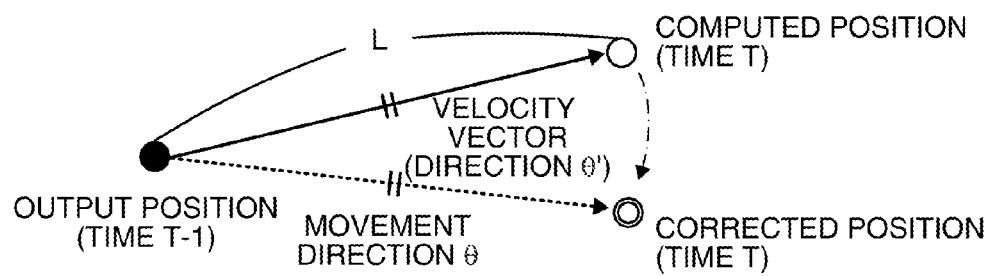
FIG. 16 is an explanatory view of the principle of position correction.

FIG. 16 is an explanatory view of the principle of position correction. A computed position at time "T" indicated by a white circle can be calculated using the output position at time "T−1" indicated by a black circle and a velocity vector (direction θ') at time "T". That is, a position after shifting a black circle by unit time in the direction θ' of a velocity vector is a white circle.

In this case, a distance "L" between the output position at time "T−1" and the computed position at time "T" is calculated using a velocity vector. In addition, a corrected position at time "T" indicated by a double circle is calculated by shifting the output position at time "T−1" by the distance "L" in the movement direction "θ" of the moving body acquired from the posture calculating section 31. If it is not a reset timing of the output position, this corrected position becomes an output position at time "T".

Figure 17:
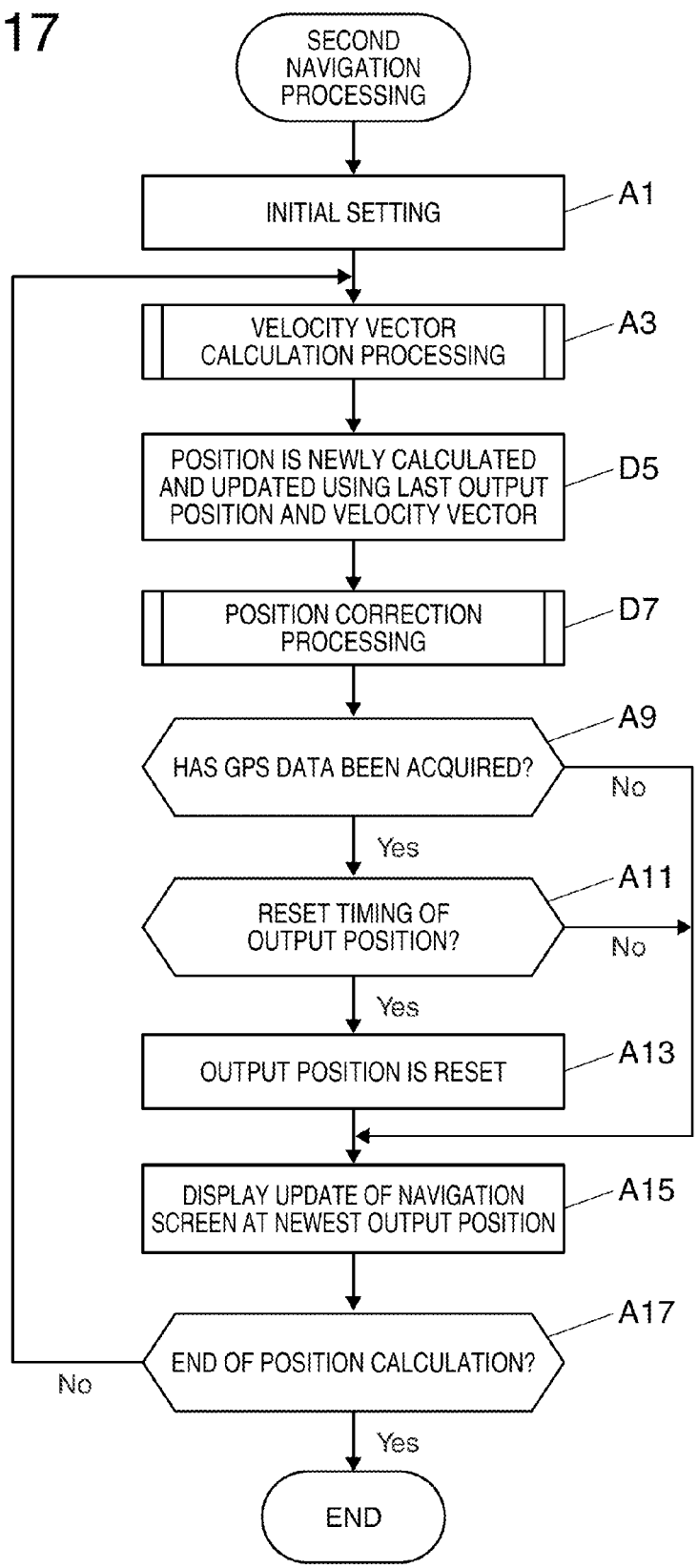
FIG. 17 is a flow chart showing the flow of second navigation processing in a modification.

FIG. 17 is a flow chart showing the flow of second navigation processing executed by the processing section 30 in this case. In addition, the same steps as in the navigation processing shown in FIG. 9 are denoted by the same reference numerals and the explanation is omitted, and this explanation will be focused on different steps from those in the navigation processing.

In the second navigation processing, after performing velocity vector calculation processing in step A3, the position calculating section 35 newly calculates and updates the position of a vehicle using the last (newest) output position and the calculated velocity vector (step D5). Then, the position correcting section 36 performs position correction processing (step D7). In the position correction processing, the position is corrected according to the principle of position correction described in FIG. 16.

7-4. Correction of a Direction of a Velocity Vector

Although the direction of a velocity vector is corrected to the detected movement direction of the moving body in the embodiment described above, the invention is not limited to this correction method as long as it is a correction using the detected movement direction.

For example, the direction of a velocity vector may be corrected by performing average processing of the direction of the velocity vector and the detected movement direction of the moving body. In this case, since the movement direction of a moving body directly detected by a sensor, such as a gyro sensor, is reliable, it is appropriate to correct a velocity vector by weighted average calculation in which the weight of the detected movement direction of the moving body is set to be high (for example, 0.8) and the weight of the direction of the velocity vector is set to be low (for example, 0.2), for example.

7-5. Correction of the Size of a Velocity Vector

Although the size of a velocity vector is changed to become small without exception when the rotation of a moving body is detected in the embodiment described above, the size of a velocity vector may also be changed as follows.

For example, a velocity (hereinafter, referred to as a "velocity at the start of rotation") of a moving body when the rotation of the moving body is detected first (at the start of rotation) is recorded. In addition, at the time of rotation of the moving body, the velocity of the moving body at the time of rotation (hereinafter, referred to as a "velocity at the time of rotation") is compared with the recorded velocity at the start of rotation. Then, the size of the velocity vector is changed on the basis of the comparison result. Specifically, if the velocity at the time of rotation is smaller than the velocity at the start of rotation, the size of the velocity vector is changed to become large ($\alpha > 1$). On the other hand, if the velocity at the time of rotation is larger than the velocity at the start of rotation, the size of the velocity vector is changed to become small ($\alpha < 1$).

When the velocity at the time of rotation is smaller than the velocity at the start of rotation, it is thought that the moving body is rotating slowly. In this case, position calculation is performed by estimating the size of the velocity vector to be slightly large, so that the calculated position is adjusted to follow the actual position of the moving body well. On the other hand, when the velocity at the time of rotation is larger than the velocity at the start of rotation, it is thought that the moving body is rotating fast. In this case, the position calculation is performed by estimating the size of the velocity vector to be slightly small.

7-6. Setting of a Correction Coefficient of a Velocity Vector

Although this is associated with the above-described correction of the size of a velocity vector, the correction coefficient "$\alpha$" may be set as follows. That is, the correction coefficient "$\alpha$" is set on the basis of the size of a rotation speed (or an angular velocity) of a moving body. When the moving body is a four-wheel vehicle, for example, a rotation speed around the $Z_B$ axis (yaw axis) is set as the rotation speed of the moving body. When the moving body is a two-wheel vehicle, for example, a rotation speed around the $X_B$ axis (roll axis) is set as the rotation speed of the moving body. In addition, the rotation speed is equivalent to an angular velocity detected by the gyro sensor 63. That is, the value obtained by multiplying the rotation speed by "$2\pi$ (rad)" is an angular velocity.

Figure 18A:
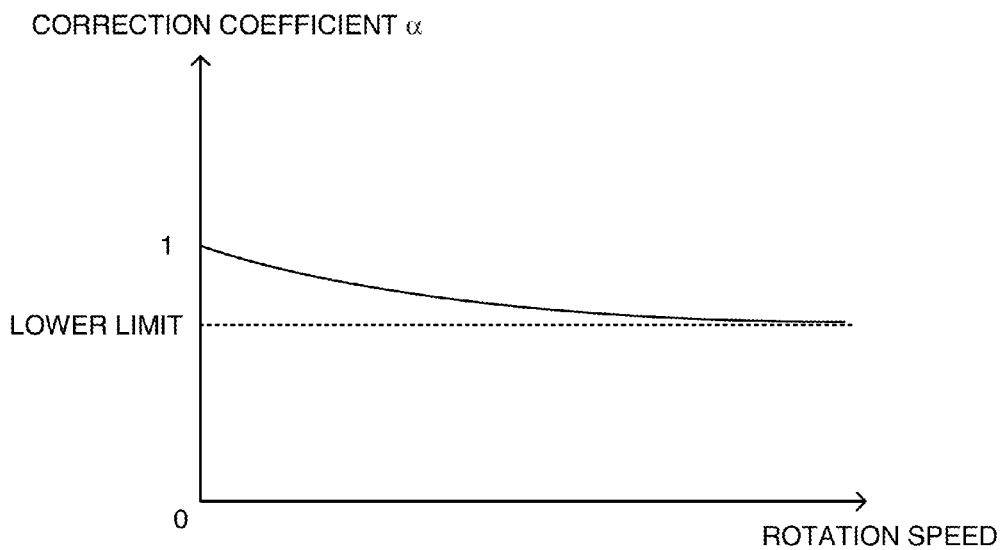
FIGS. 18A and 18B are graphs showing examples of the relationship between the rotation speed and a correction coefficient.
Figure 18B:
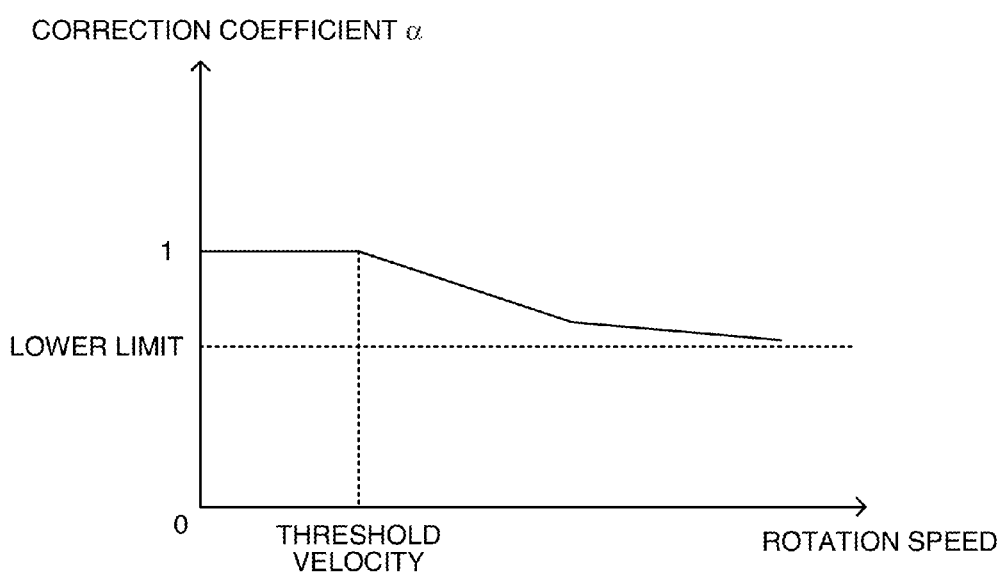

FIGS. 18A and 18B are views for explaining the principle of setting a correction coefficient in this case. FIGS. 18A and 18B are graphs showing the relationship between the rotation speed of a vehicle and the correction coefficient "$\alpha$". It became clear by experiment that the accuracy of position calculation was reduced if the correction coefficient "$\alpha$" was set to be too small. For this reason, it is preferable to set the lower limit of the correction coefficient "$\alpha$" in advance.

Moreover, for example, as shown in FIG. 18A, the correction coefficient "α" is set to be gradually reduced in a range where it is not reduced up to the lower limit as the rotation speed is increased.

Moreover, for example, as shown in FIG. 18B, a threshold value of the rotation speed is set in advance. In addition, the correction coefficient "α" may be fixed to "1" (α=1) until the rotation speed reaches a threshold value, and the correction coefficient "α" may be gradually reduced from the point in time when the rotation speed exceeds the threshold value.

7-7. Detection of a Movement Direction

In the embodiment described above, the movement direction of a moving body is detected by calculating the posture of the moving body using the detection result of a gyro sensor. However, it is also possible to detect a movement direction using other detection means as long as the movement direction can be acquired with high reliability. For example, the movement direction may also be detected using a direction sensor, such as a geomagnetic sensor.

7-8. Output Position

In the embodiment described above, the computed position is reset at the position calculated by the GPS at a predetermined reset timing. However, a final output position may be calculated and determined using both the position calculated by the GPS (GPS calculation position) and the position calculated by the inertial navigation operation of the present embodiment (inertial navigation operation position). For example, the output position may be determined by performing filtering using a filter, which performs average processing of a GPS calculation position and an inertial navigation operation position, or a Kalman filter, which is a kind of estimation method based on the probability theory.

The entire disclosure of Japanese Patent Application No. 2010-090557, filed on Apr. 9, 2010 is expressly incorporated by reference herein.

What is claimed is:

1. A non-transitory computer readable medium comprising executable instructions, that when executed, cause a processor to execute a method of calculating a position of a moving body, the method comprising:
    detecting a movement direction of the moving body;
    calculating a velocity vector of the moving body using a detection result of an acceleration sensor installed in the moving body;
    correcting the velocity vector using the movement direction;
    calculating the position of the moving body using the corrected velocity vector; and
    detecting rotation of the moving body,
    wherein the correcting of the velocity vector includes changing the size of the velocity vector when the moving body rotates based on the comparison of the velocity of the moving body at the time of the rotation with recorded velocity at start of rotation.

2. The method according to claim 1,
    wherein the correcting of the velocity vector includes correcting a direction of the velocity vector to the detected movement direction.

3. A non-transitory computer readable medium comprising executable instructions, that when executed, cause a processor to execute a method of calculating a position of a moving body, comprising:
    detecting a movement direction of the moving body;
    calculating a velocity vector of the moving body using a detection result of an acceleration sensor installed in the moving body;
    calculating the position of the moving body using the velocity vector; and
    correcting the calculated position using the detected movement direction based on the comparison of the velocity of the moving body at the time of the rotation with recorded velocity at start of rotation.

4. The method according to claim 3, further comprising:
    calculating a posture of the moving body using a detection result of a gyro sensor installed in the moving body; and
    performing coordinate transformation of the detection result of the acceleration sensor to an absolute direction by coordinate transformation of a relative detection direction of the acceleration sensor with respect to the moving body to the absolute direction using the calculated posture,
    wherein in the calculating of the velocity vector, the velocity vector is calculated using a detection result after the coordinate transformation.

5. The method according to claim 1,
    wherein the moving body is a vehicle.

6. A position calculating device installed in a moving body to calculate a position of the moving body, comprising:
    an acceleration sensor;
    a movement direction detecting section which detects a movement direction of the moving body;
    a velocity vector calculating section which calculates a velocity vector of the moving body using a detection result of the acceleration sensor;
    a velocity vector correcting section which corrects the velocity vector using the movement direction detected by the movement direction detecting section; and
    a position calculating section which calculates the position of the moving body using the velocity vector corrected by the velocity vector correcting section;
    wherein when rotation of the moving body is detected, the velocity vector is corrected by changing the size of the velocity vector based on the comparison of the velocity of the moving body at the time of the rotation with recorded velocity at start of rotation.

7. A position calculating device installed in a moving body to calculate a position of the moving body, comprising:
    an acceleration sensor;
    a movement direction detecting section which detects a movement direction of the moving body;
    a velocity vector calculating section which calculates a velocity vector of the moving body using a detection result of the acceleration sensor;
    a position calculating section which calculates the position of the moving body using the velocity vector calculated by the velocity vector calculating section;
    a position correcting section which corrects the position calculated by the position calculating section using the detected movement direction; and
    detecting rotation of the moving body,
    wherein the correcting of the velocity vector includes changing the size of the velocity vector when the moving body rotates based on the comparison of the velocity of the moving body at the time of the rotation with recorded velocity at start of rotation.

* * * * *